United States Patent [19]

Young et al.

[11] Patent Number: 4,641,471
[45] Date of Patent: * Feb. 10, 1987

[54] FASTENER FOR SECURING ROOFING MATERIAL TO CEMENTITIOUS ROOF DECKS

[75] Inventors: Kenneth E. Young, Greenville, S.C.; Hubert T. Dudley, Chelmsford; Robert T. Frohlich, Bedford, both of Mass.

[73] Assignee: W. R. Grace & Co., Cambridge, Mass.

[*] Notice: The portion of the term of this patent subsequent to Feb. 10, 2004 has been disclaimed.

[21] Appl. No.: 882,859

[22] Filed: Mar. 2, 1978

[51] Int. Cl.⁴ .................. F16B 15/02; F16B 15/04
[52] U.S. Cl. ...................... 52/361; 52/366; 52/411; 52/515; 411/448; 411/477; 411/531; 411/545
[58] Field of Search ............ 411/448, 473, 461, 477, 411/545; 85/1 JP, 11, 23, 26, 28, 29, 50 R, 63; 52/361, 362, 363, 410, 411, 412, 413, 414, 516, 544, 748, 515, 366; 156/66, 92, 295, 71, 91, 252; 428/133, 139, 468

[56] References Cited

U.S. PATENT DOCUMENTS

| 63,737 | 4/1867 | McGill | 85/13 |
|---|---|---|---|
| 308,837 | 12/1884 | Frost | 85/13 |
| 578,151 | 3/1897 | Knudsen | 85/13 |
| 667,814 | 2/1901 | Wyland | 85/11 |
| 795,553 | 7/1905 | Sherman | 85/50 R X |
| 855,318 | 5/1907 | Kindig | 85/13 |
| 921,767 | 5/1909 | White | 52/444 |
| 1,025,799 | 5/1912 | Fulenwider | 85/13 |
| 1,102,871 | 7/1914 | Carroll | 85/28 |
| 1,143,091 | 6/1915 | Stimpson | 85/50 R |
| 1,231,887 | 7/1917 | Herman | 85/13 |
| 1,264,504 | 4/1918 | Gude | 52/366 |
| 1,278,270 | 9/1918 | Wilber | 428/139 |
| 1,670,890 | 5/1928 | Illmer | 85/50 R |
| 1,700,561 | 1/1929 | Commin et al. | 156/92 |
| 2,102,901 | 12/1937 | Laursen | 85/50 R X |
| 2,157,374 | 5/1939 | Wells | 52/363 |
| 2,193,122 | 3/1940 | Crabbs | 85/50 R X |
| 2,498,627 | 2/1950 | Hallock | 85/11 |
| 2,744,591 | 5/1956 | Simpson | 85/1 JP |
| 2,745,308 | 5/1956 | Gisondi | 85/13 |
| 3,135,069 | 6/1964 | Schuller et al. | 52/411 X |
| 3,240,101 | 3/1966 | Hallock | 85/23 |
| 3,246,439 | 4/1966 | Foster et al. | 85/28 |
| 3,466,967 | 9/1969 | Hallock | 85/11 |
| 3,710,672 | 1/1973 | Hallock | 85/11 |
| 3,812,817 | 5/1974 | Hallock | 85/11 X |
| 3,878,756 | 4/1975 | Hallock | 85/23 |
| 3,882,755 | 5/1975 | Enstrom | 85/11 |
| 3,905,549 | 9/1975 | Walker | 85/26 |
| 4,031,802 | 6/1977 | Hallock | 85/11 |
| 4,043,246 | 8/1977 | Wright | 85/11 |

FOREIGN PATENT DOCUMENTS

| 682956 | 10/1939 | Fed. Rep. of Germany | 85/28 |
|---|---|---|---|
| 920221 | 11/1954 | Fed. Rep. of Germany | 85/13 |
| 2636627 | 2/1978 | Fed. Rep. of Germany | 52/444 |
| 935042 | 1/1948 | France | 85/50 R |
| 7415863 | 6/1976 | Netherlands | 85/50 R |
| 957852 | 5/1964 | United Kingdom | 85/13 |

OTHER PUBLICATIONS

"Inspec Data", E. S. Products, Inc. 07500, May 1976.

Primary Examiner—Thomas J. Holko
Attorney, Agent, or Firm—William L. Baker

[57] ABSTRACT

A sheet metal nail of the type for securing built-up roofing membranes used to waterproof cementitious roof decks has a head and a hollow shank portion integral therewith and designed to resist withdrawal of the nail from the deck in a conventional manner, the head however being of larger diameter than the head of the conventional nail used for this purpose and further having a design which allows the fluid asphalt conventionally poured over the nail during construction of the roofing membrane to bond the portion of the membrane beneath the head and thereby increase the wind uplift resistance of the roofing membrane. The nail is preferably of "one piece" construction formed from a sheet metal blank.

8 Claims, 9 Drawing Figures

U.S. Patent   Feb. 10, 1987   Sheet 1 of 2   4,641,471
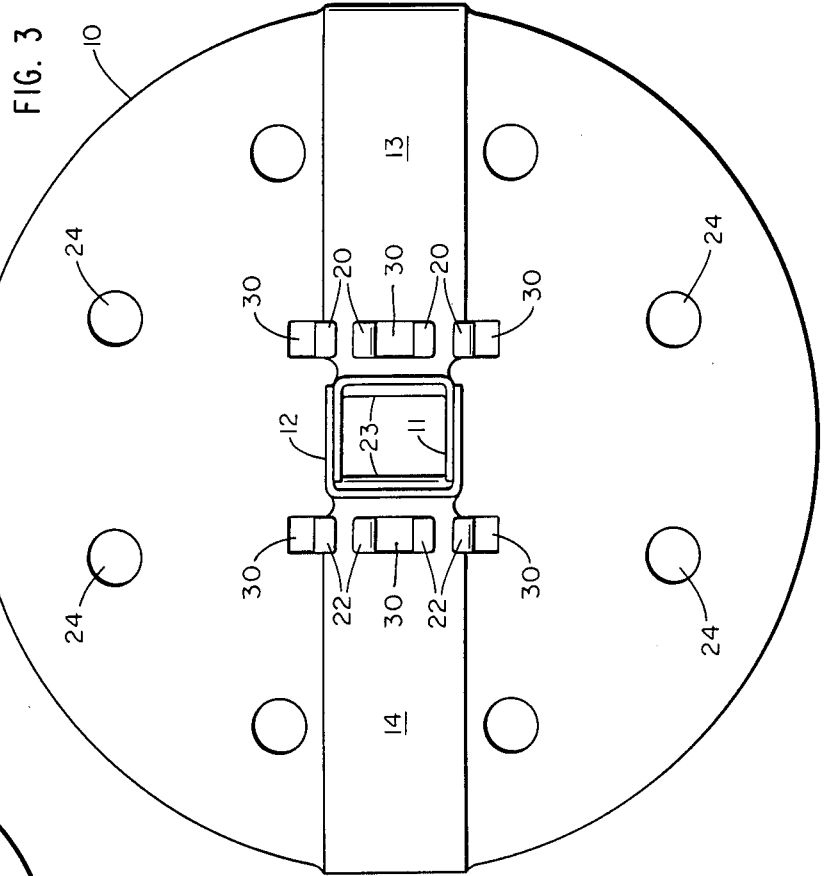
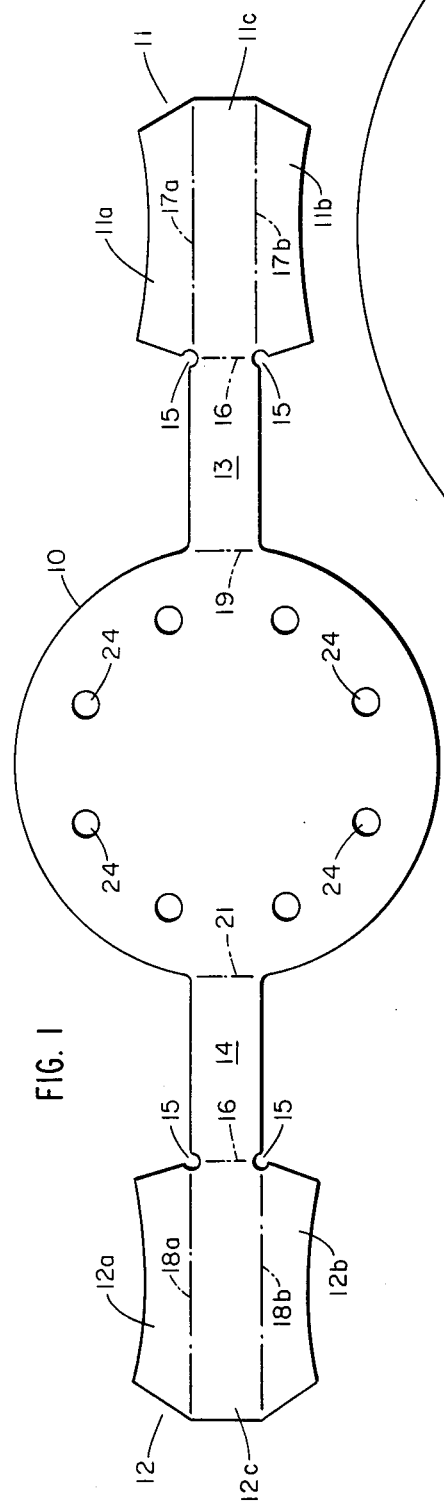
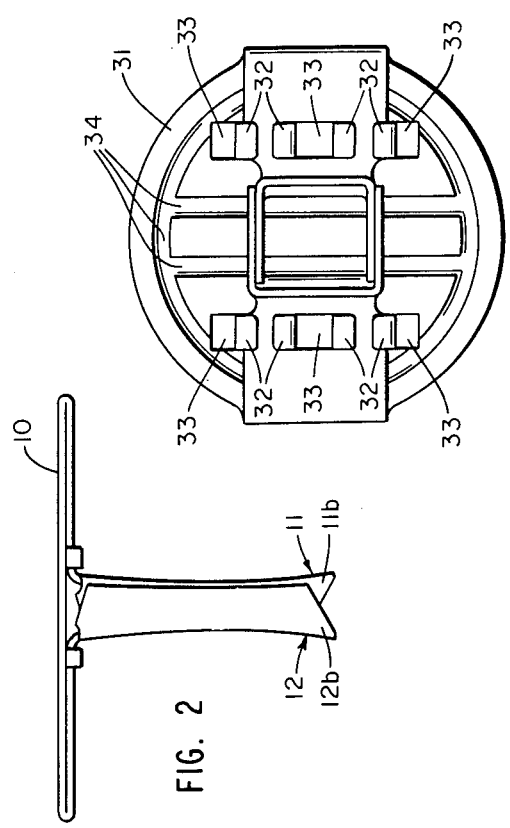

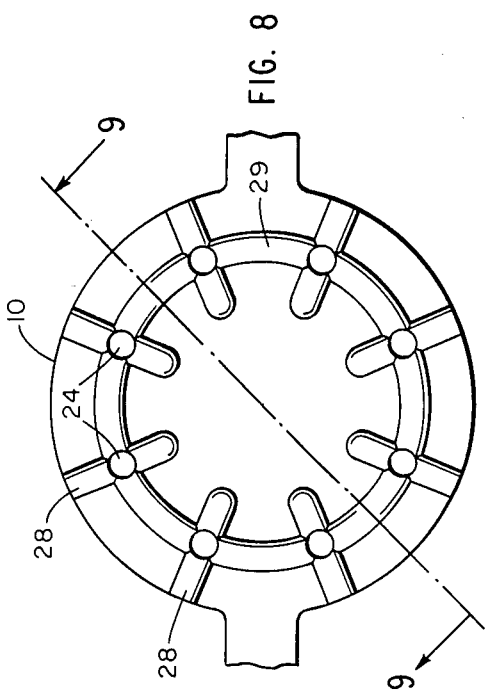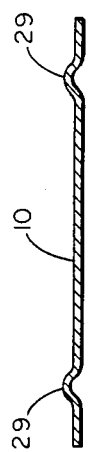
FIG. 8
FIG. 9
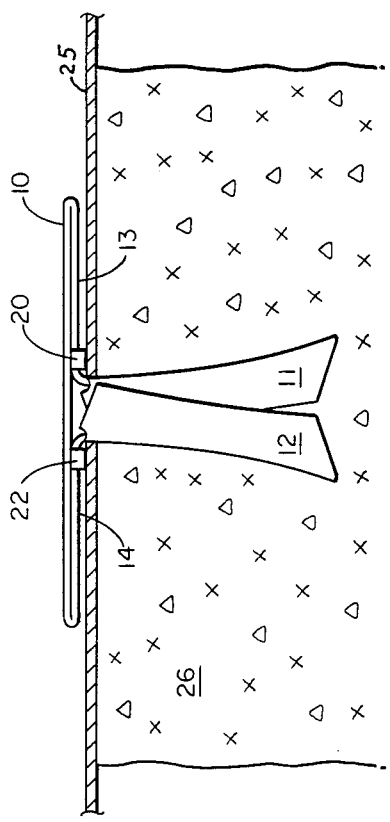
FIG. 5
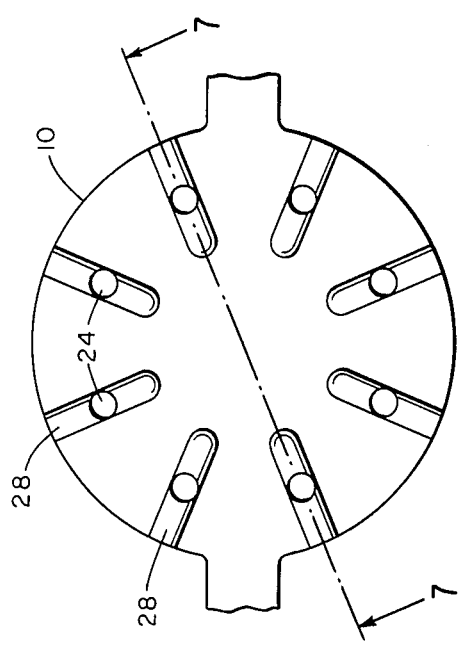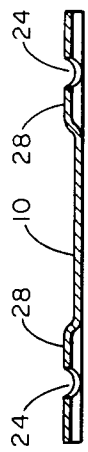
FIG. 7
FIG. 6

FASTENER FOR SECURING ROOFING MATERIAL TO CEMENTITIOUS ROOF DECKS

BACKGROUND OF THE INVENTION

This invention relates to fasteners of the type utilized to secure coverings to cementitious substrates. More particularly, this invention concerns fasteners or "nails" of the type used to anchor built-up waterproofing membranes to cementitious roof decks, which fasteners improve the wind uplift resistance of the built-up roofing membrane.

Conventional "flat" roofs or roof decks often utilize a layer of hydratable cementitious material such as Portland cement type concrete to impart structural strength and rigidity and/or thermal insulating properties in the case of lightweight aggregate-containing concretes which hydrate into relatively low-density masses. Typically a waterproof covering layer is applied to the uppermost surface of the cementitious layer and such covering layer must be secured in some fashion. Most commonly the waterproof covering is in the form of several plies of sheet material bonded together by hot asphalt, each ply being applied or "built-up" on the job site and adhered together by intermittent moppings of hot fluid asphalt. The first ply, termed the "base ply", is either adhered over its entire surface to the surface of the cementitious layer using e.g. hot asphalt, or is secured only at spaced intervals using "spot" applications of hot asphalt or mechanical fasteners forced through the base ply and into the soft concrete before it has fully hydrated into a hard rigid mass. The remaining plies of the built-up roofing are then secured to the base ply over their entire surfaces by hot moppings of fluid asphalts.

The mechanical fasteners or "nails" used to secure the base ply in various "spots" generally have a penetrating shank designed to resist withdrawal from the concrete layer, and a flat head which is wider in diameter than the shank thereby acting as a washer to hold the built-up roofing. The shank is typically made resistant to withdrawal from the concrete by causing the shank to expand in diameter near its penetrating end either as it enters the soft concrete or soon thereafter. In the fasteners for example of U.S. Pat. Nos. 3,466,967; 3,710,672 and 4,031,802 to Hallock, the shank portion of the fastener comprises a slit cone or a pair of hinged legs and is caused to expand as the fastener is inserted into the soft cementitious mass. The shank portions of these fasteners moreover define a hollow space which receives a portion of the soft cement mixture as the fastener is driven thereby increasing the resistance of the fastener to withdrawal particularly after the cement has hardened.

The nail in particular of the type shown in U.S. Pats. No. 3,710,672 and 4,031,802 to Hallock has proven in practice to be especially effective for locking built-up roofing to lightweight low density expanded vermiculite or perlite containing concretes. This nail has a flat, disc-shaped head approximately 1.19 inches (3.02 cms.) in diameter and a pair of channel-shaped, overlapping legs approximately 1.63 inches (4.13 cms.) in length hinged to the head and defining the aforementioned hollow space. The nail is economically formed as a one piece integral product from sheet metal stock and has a high resistance to withdrawal from the concrete layer. Difficulty has been experienced however in passing certain stringent wind uplift resistance requirements with built-up roofings fastened to concrete layers using nails of this type. A need exists therefore for a practical manner of enhancing the wind uplift resistance of roofings secured with this and other similar types of "base ply" fasteners.

SUMMARY OF THE INVENTION

In laboratory experiments designed to test the resistance of built-up roofing membranes to being uplifted by wind, essentially a vacuum is created above the built-up roofing simulating the effect of a high wind upon an installed roof atop a building. In investigating the cause of failure of built-up roofings to remain attached to insulating concretes using the aforementioned fasteners of U.S. Pat. No. 3,710,672 in particular, it was found that the cause of failure was due to tearing loose of the base ply around the perimeter of the nail head as opposed to withdrawal of the shank from the concrete layer or delamination of the plies in the built-up roofing as might first be theorized. Moreover it was discovered that simply increasing the the number of nails used to attach the base or the first ply of the roofing by a practical proportion did not allow the roof to pass the more stringent requirements for wind uplift resistance. Further investigations led to the finding that this tearing could be avoided by providing the nail with a separate, disc-like, flat tab having a central opening penetrated by the shank of the nail and wider in diameter than the head of the nail, the tab further having a number of holes through its outer perimeter to allow the hot fluid asphalt subsequently poured over the nail to flow therethrough and bond the portion of the base ply beneath the tab to the upper plies of the built-up roofing. The result is an effective reinforcement of the weakened portions of the base ply beneath the tab and fastener head against tearing loose during uplifting by a vacuun above the roofing simulating the effect of a high wind. The tab is described in our copending application filed herewith entitled "FASTENER FOR SECURING ROOFING MATERIAL TO CEMENTITIOUS ROOF DECKS HAVING REMOVABLE TAB"Ser. No. 882,709.

In the present invention, an improved nail for attaching "base plys" to cementitious decks is described, which nail also has improved wind uplift-resistance imparting characteristics. The nail of this invention avoids the necessity of using a separate removable tab as described in our copending application and its attendant inconveniences. The improved nail of the invention can be fashioned from a single blank of sheet metal stock in the desirable manner of the nails of the above mentioned patents.

The nail of this invention has a generally flat disc-like head and expandable shank portion like the prior art base ply nails of the aforementioned U.S. patents to Hallock, but the head of the nail according to the invention is enlarged in diameter and has a number of holes through its outer perimeter to allow fluid asphalt poured over the head to bond and reinforce the portion of the base ply beneath the head. In preferred embodiments of the invention, the reinforcing action is enhanced by a head design which causes the asphalt to additionally flow beneath the surface of the head by providing lugs or stand-offs on its lower surface, and/or channels communicating with the holes in the head and/or edges of the head. In these preferred embodiments, the portion of the base ply beneath the head becomes bonded both to the upper plies of roofing by way of the openings, and also to the lower surface of the head for optimum reinforcement.

BRIEF DESCRIPTION OF THE DRAWINGS

FIG. 1 is a top plan view of a blank from which a nail according to the invention can be formed.

FIG. 2 is a side elevation of a nail formed from the blank of FIG. 1;

FIG. 3 is a view looking upwards from the bottom of the nail of FIG. 2;

FIG. 4 is a view looking upwards similar to FIG. 3 of a prior art nail;

FIG. 5 is a side perspective of a nail of the invention in an installed position;

FIG. 6 is a top plan view of a preferred head design;

FIG. 7 is a sectional view taken along the line 7—7 of FIG. 6;

FIG. 8 is a top plan view of another preferred head design for the nail of the invention; and FIG. 9 is a sectional view along the line 9—9 of FIG. 8.

DETAILED DESCRIPTION

In FIG. 1 a blank from which the nail of the invention can be made is shown. The blank has a central, generally flat head or cap portion 10 and a pair of extensions from the head, 11 and 12, which form the legs 11 and 12, respectively, making up the hollow shank portion of the assembled nail shown in FIGS. 2, 3 and 5. Each of extensions 11 and 12 have outward flaps 11a, 11b, 12a and 12b, which form the lateral, generally parallel sides of the legs 11 and 12 of the finished nail in FIGS. 2, 3 and 5. Each extension also has intermediate portions 11c and 12c which form a third intermediate wall portion of each leg of the assembled nail. The extensions 11 and 12 further have flaps 13 and 14 respectively, connecting the intermediate portions of the extensions to the head 10. Undercuts 15 are provided at the juncture of the connecting flaps 13 and 14 with the flaps 11a, 11b, 12a and 12b to provide a narrow flexible hinge along the lines 16 between the legs 11 and 12 and the head 10 in the finished nail.

The blank shown in FIG. 1 is made into the nail shown in FIGS. 2, 3, and 5 as follows. Flaps 11a and 11b are folded downwardly along the lines 17a and 17b to give a generally U-shaped configuration to the leg 11. Moreover the folding along the lines 17a and 17b is accomplished in a manner such that the intermediate portion 11c is curved inwardly in the direction of opposed leg 12 in the finished nail. Each of the flaps 12a and 12b of extension 12 are then folded in a similar fashion along the lines 18a and 18b to give leg 12 also a general U-shaped configuration. The width of intermediate portion 12c is somewhat greater than that of 11c in order that the side portions 12a and 12b of leg 12 overlap the side portions 11a and 11b in the assembled nail as shown in FIG. 2.

The extension 11 is then folded along the line 16 and the line 19 such that the underside of flap 13 lies flat against the bottom of head 10 as shown in FIG. 3, and the direction of leg 11 is downwardly from cap 10 as shown in FIGS. 2, 3, and 5. Flap 13 can be secured to head 10 by punching out portions 20 of head 10 and flap 13 and folding the punched-out portions over flap 13 as shown in FIG. 3. The leg 11 however remains easily bendable in an outward direction along the narrow fold line 16. Extension 12 is then folded along lines 21 and 16 in a manner similar to extension 11 along the lines 16 and 19. This results in flap 14 being positioned flat against the underside of head 10 as shown in FIG. 3, with leg 12 extending downwardly from the head 10 and substantially completely enveloping leg 11. Punchouts 22 or portions of the head 10 and flap 14 are used to secure the leg 12 to the head 10. The result is that legs 11 and 12 are easily flexed with respect to head 10. Alternatively, only one leg can be hinged to the head 10, the other being rigidly connected to the head as disclosed in U.S. Pat. No. 4,043,246 to Wright.

Referring now particularly to FIG. 2, the assembled nail is seen to have a generally flat head serving also as a washer, and a hollow, somewhat square, shank portion made up of the opposed, U-shaped, overlapped legs 11 and 12. The penetrating ends, that is, the ends of legs 11 and 12 distant from the head 10, can be pointed as shown to make penetration of the covering and the soft cement easier. As disclosed in the U.S. Pat. No. 3,710,672, the cross section of the shank immediately below the head is preferably substantially equal to the cross section of the shank at the penetration end. Thus when the nail is driven, the size of the opening which is made by the penetrating end is not materially larger than the size of the shank immediately beneath the head, thereby avoiding an enlarged opening which would result if the shank were cone-shaped as in U.S. Pat. No. 3,466,967. It should be noted that the cross section of the shank at a point intermediate of its upper and lower ends will be less than that of such ends due to the inward curvature of intermediate walls 11c and 12c. These inwardly curved portions can be seen as 23 in FIG. 3. Upon insertion of the nail in a soft cementitious mixture (FIG. 5), the portion of the cement entrapped in the hollow between legs 11 and 12 will bear against these curved portions 23 and caused them to spread.

The head 10 of the base ply nail of the invention has an enlarged diameter as compared to the head 31 of the Hallock prior art nail (U.S. Pat. No. 3,710,672) presently in use (FIG. 4). The head 10 of the nail of the invention has a cross-wise dimension or diameter of at least about 1.75 inches (4.5 cms.), and preferably of at least about 2 inches (5.08 cms.). In the specific preferred embodiment shown, the head 10 has a diameter of 2.75 inches (6.99 cms.) as compared to the head of the prior art nail of FIG. 4, which has a diameter as aforementioned of about 1.19 inches (3.02 cms.). Within the enlarged portion of head 10 of the nail of the invention, several openings or holes 24 are placed near the outer perimeter of the head. These openings have a width such that fluid asphalt poured on the installed nail will enter, for example a width of at least about 0.06 inch (0.15 cm.), preferably at least about 0.12 inch (0.30 cm.). The openings 24 are located such that, for example, their centers are at least about 0.63 inch (1.6 cms.), preferably at least about 0.75 inch (1.9 cms.) from the center of head 10, for most effective reinforcement of the base ply beneath head 10.

The head 10 also has holes 30 within its inner perimeter nearest its center as the result of the punching operation used to create knock-outs 20 and 22 serving to lock legs 11 and 12 as aforementioned. These openings 30 are the equivalent of openings 33 created in the formation of the knockouts 32 in the prior art Hallock nail shown in FIG. 4.

In FIG. 5, a nail according to the invention is shown installed through base ply 25 and into layer 26 of insulating concrete containing e.g. expanded vermiculite, Portland cement and foaming agents. The flaps 13 and 14, as well as knock-outs 20 and 22, will act to keep the lower face of tab 10 from contacting the upper surface of base ply 25 fully as shown. Thus when hot fluid asphalt (not shown) is poured or mopped over the installed nail and base ply 25 of FIG. 4, the asphalt will enter the holes 24 in the head shown in FIGS. 1 and 3 and flow into the space between the head and the base ply. Further plies of built-up roofing (not shown) layed upon the nail and base ply while the asphalt is still fluid and tacky will thus be bonded to the base ply 25 through openings 24. Additionally, the portion of the base ply immediately beneath the head will be bonded to the head by way of the asphalt which has flowed into the space between the head and the base ply. The head 10 can have additional lugs or "standoffs" beneath it if desired to further insure that the head is spaced from the base ply upon installation.

Various alternative constructions for head 10 are shown in FIGS. 6 through 9. In FIGS. 6 and 7 the head 10 has generally straight, non-interconnecting embossments 28 approximately 0.13 inch (0.32 cm.) wide in its surface communicating both with holes 24 and the outer edge of the head. The embossments 28 raise from the surface of the head e.g. about 0.063 inch (0.19 cm.). The embossments may be raised from the upper surface of the head as shown in which case they create channels between the head and the base ply which serve to conduct and distribute fluid asphalt. The embossments may also raise from the lower surface in which case they also act as "stand-offs" to raise the head from the surface of the base ply. The head 10 of FIGS. 6 and 7 can have both a number of embossments 28 which raise from its upper surface and from its lower surface, and such embossments can be alternately staggered with respect to one another around the circumference of the head.

The embossment in the surface of head 10 may also be in the form of one or more continuous circumferential channels, 29 in FIGS. 8 and 9, which preferably interconnect all of openings 24 as shown, and which may be raised from either or both surfaces of the head. In FIG. 8 the head has both a circumferential embossment or channel 29, raised from the upper surface of the head and straight non-interconnecting channels 28, and the openings 24 are located such that they communicate with both channels 28 and 29. Circular embossments 29 are located in the outer perimeter of head 10 and function to conduct fluid asphalt from openings 24. Head 10 can also have embossments within its inner perimeter to strengthen the head against flexing similar to 34 of the prior art nail of FIG. 4.

It is obvious to one skilled in the art that the head 10 of the nail of the invention and openings 24 therethrough can have a geometry other than circular as has been shown by way of illustration only in the drawings. For example, head 10 can have an overall square or rectangular configuration as can openings 24. Also the embossments in the surfaces of the head can be made interconnecting or non-interconnecting in any desired fashion. Moreover, the shank portion of the nail can be of a design similar to that used in connection with any of the various hollow nails or fasteners conventionally used to attach roofing membranes in the art other than that shown in the drawings. The nail of the invention can obviously be used in connection with cementitious materials other than vermiculite/Portland cement mixes, for example, mixes containing gypsum or other hydratable binders with or without lightweight aggregate or foaming agents.

It is claimed:

1. An improved sheet metal nail for attaching a base ply of a multi-ply built-up roofing membrane to a soft not fully cured cementitious construction material and over which nail and ply fluid asphalt is to be applied after installation, said nail having a generally flat disc-shaped head serving as a washer to hold said base ply down and a narrower hollow penetrating shank depending from the lower planar surface of said head, said shank being comprised of a pair of overlapping, channel-shaped legs, at least one of said legs being adapted to expand relative to the other during insertion into said construction material to thereby capture said construction material within said hollow shank and lock the nailing element in the construction material; said head having broad upper and lower opposed planar surfaces and narrow terminal end surfaces, the width of said head across its narrowest dimension being at least about 1.75 inches, said head having a plurality of openings therethrough distributed around its outer extremity which openings extend from said upper planar surface to said lower planar surface, said head further having at least one embossment raised from at least one of its said planar surfaces communicating with said opening and edge of said head and acting as an asphalt-conducting channel, whereby fluid asphalt applied over said nail and said base ply is permitted to fill said openings and also to flow between said head and said base ply in order to bond the portion of the base ply beneath said tab and increase the resistance of the roofing membrane to uplifting by wind.

2. The nail of claim 1 wherein said openings through said head are at least about 0.06 inch in diameter.

3. The nail of claim 1 wherein said head has at least one raised embossment from its said upper planar surface.

4. The nail of claim 1 having a plurality of said embossments, certain of said embossments raising from a said planar surface of said head, other of said embossments raising from the opposed planar surface of said head.

5. The nail of claim 1 wherein said head has a width of at least about 2 inches.

6. The nail of claim 1 wherein said openings through said head have a width of at least about 0.12 inch.

7. The nail of claim 1 wherein said embossment is raised from the said upper planar surface of said head.

8. The nail of claim 1 wherein said embossment is raised from the said planar surface of said tab adjacent said base ply.

* * * * *